(12) United States Patent
Marsh et al.

(10) Patent No.: US 9,922,776 B2
(45) Date of Patent: Mar. 20, 2018

(54) POLYMER SUPERCAPACITOR AND METHOD OF MANUFACTURE

(71) Applicant: The United States of America as Represented by The Secretary of the Army, Washington, DC (US)

(72) Inventors: Charles P. Marsh, Urbana, IL (US); Meredith C. K. Sellers, Newark, CA (US); Niels P. Zussblatt, Goleta, CA (US)

(73) Assignee: The United States of America as Represented by The Secretary of The Army, Washington, DC (US)

( * ) Notice: Subject to any disclaimer, the term of this patent is extended or adjusted under 35 U.S.C. 154(b) by 15 days.

(21) Appl. No.: 15/076,551

(22) Filed: Mar. 21, 2016

(65) Prior Publication Data
US 2017/0271094 A1 Sep. 21, 2017

(51) Int. Cl.
*H01G 11/56* (2013.01)
*H01G 11/24* (2013.01)
*H01G 11/46* (2013.01)
*H01G 11/04* (2013.01)
*H01G 11/86* (2013.01)

(52) U.S. Cl.
CPC ............. *H01G 11/56* (2013.01); *H01G 11/04* (2013.01); *H01G 11/24* (2013.01); *H01G 11/46* (2013.01); *H01G 11/86* (2013.01)

(58) Field of Classification Search
CPC ........ H01G 11/04; H01G 11/28; H01G 11/32; H01G 11/42; H01G 11/155; H01G 9/028; H01G 9/042
See application file for complete search history.

(56) References Cited

U.S. PATENT DOCUMENTS

| 2012/0034500 A1* | 2/2012 | Kaun | H01M 2/0227 429/61 |
| 2012/0134072 A1* | 5/2012 | Bae | H01G 11/28 361/502 |
| 2013/0083452 A1* | 4/2013 | Chiu | H01G 11/36 361/502 |

* cited by examiner

*Primary Examiner* — Nguyen Ha
(74) *Attorney, Agent, or Firm* — Brian C. Jones

(57) ABSTRACT

The present invention is a polymer supercapacitor and method for making such a supercapacitor. The supercapacitor is formed by loading a flexible electrode plate of a high surface area material with metal oxide particles, then encasing the electrode plate in a coating of a polymer electrolyte. The electrode plate is then folded in half and flexible plates attached to the upper and lower surfaces to form the supercapacitor.

11 Claims, 2 Drawing Sheets

POLYMER SUPERCAPACITOR AND METHOD OF MANUFACTURE

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

BACKGROUND OF THE INVENTION

1. Field of Invention

This invention relates to the field of electrical devices and more specifically to an electrolytic capacitor.

2. Description of Related Art

Supercapacitors are highly optimized capacitors which have dramatically increased charge storage capability compared to conventional capacitors. Supercapacitors can recharge in a matter of seconds, compared with the hours required to recharge a standard battery. Supercapacitors may be recharged more than one million times and are not susceptible to deterioration when exposed to cold temperatures. The turnaround efficiencies of supercapacitors (the percentage of charge energy that can be recovered) are more than 90 percent, compared with typical battery turnaround efficiencies of 50 percent.

Current production methods for supercapacitors are costly and present a high level of risk to human workers. Currently, supercapacitor electrodes are fabricated for custom applications and many require high surface area materials (HSAMs), such as carbon nanotubes (CNTs). CNTs are complex to manufacture and form into a usable shape. CNT fabrication requires multi-phased production and assembly of binder-enriched slurries of active material, resistance-lowering interlayers, and current collectors. After fabrication, the supercapacitor may shed HSAM materials, causing potential health risks upon exposure.

In addition to the hazards posed by HSAM materials, the liquid electrolytes create risks, particularly in pressurized environments. The electrolytic materials may be highly toxic or corrosive.

There is an unmet need in the art for more efficiently manufactured supercapacitors which can utilize more easily stabilized electrolytes and HSAMs.

There is a further unmet need in the art for a method of manufacture of supercapacitors which reduces worker exposure to supercapacitor materials.

BRIEF SUMMARY OF THE INVENTION

One embodiment of the present invention is a polymer supercapacitor device including a flexible electrode plate having a C-shape. The flexible electrode plate is comprised of a high surface area material (HSAM) and a plurality of metal oxide particles distributed within the HSAM. A coating comprised of a polymer electrolyte forms a flexible layer to encase the flexible electrode plate. A first flexible plate comprised of an electrically conductive material is in contact with an upper surface of the flexible electrode plate. A second flexible plate comprised of the electrically conductive material is in contact with lower surface of the flexible electrode plate.

Another embodiment of the present invention is a method of making the above polymer supercapacitor device. First, the method places at least one flexible electrode plate in a first container of aqueous metal solution. The method then removes the flexible electrode plate from the first container. Next, the method places the flexible electrode plate in a second container of liquid-phase polymer electrolyte and encases the flexible electrode plate in a coating. The method then removes the flexible electrode plate from the second container. Next, the method folds the flexible electrode plate in half. The method then attaches first and second flexible plates to an upper surface and a lower surface, respectively, of the flexible electrode plate to form the polymer supercapacitor.

BRIEF DESCRIPTION OF SEVERAL VIEWS OF THE DRAWING(S)

TERMS OF ART

Figure 1:
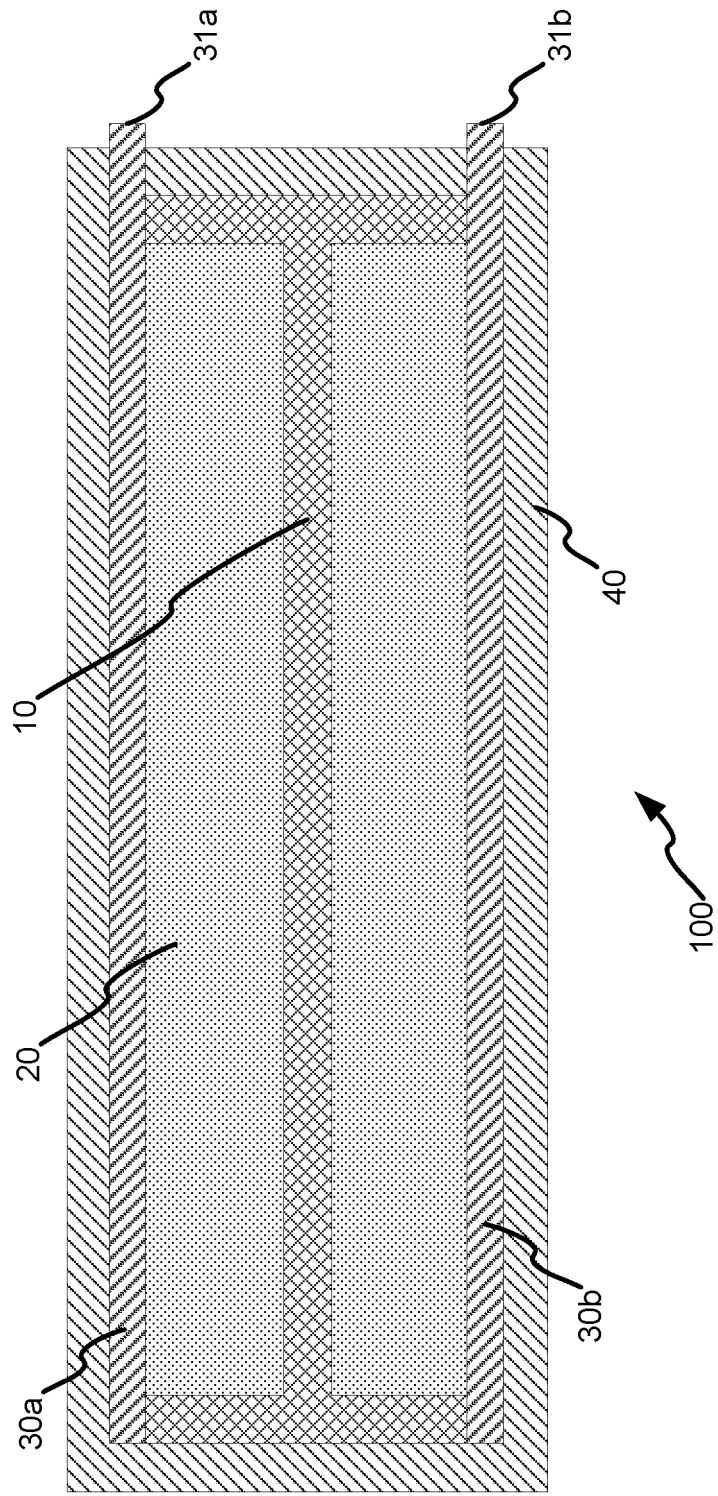
FIG. 1 illustrates a cross-sectional view of an exemplary embodiment of a polymer supercapacitor.

As used herein, the term "aqueous acid electrolyte" means an electrically conducting solution of an acidic substance dissolved in water. The acidic substance may include, but is not limited to, sulfuric acid ($H_2SO_4$) and phosphoric acid ($H_3PO_4$).

As used herein, the term "aqueous base electrolyte" means an electrically conducting solution of an alkaline substance dissolved in water. The alkaline substance may include, but is not limited to, potassium hydroxide (KOH), sodium hydroxide (NaOH), lithium hydroxide (LiOH).

As used herein, the term "aqueous neutral electrolyte" means an electrically conducting solution of a pH neutral substance dissolved in water. The pH neutral substance may include, but is not limited to, sodium sulfate ($Na_2SO_4$), sodium sulfite ($Na_2SO_3$), sodium nitrate ($NaNO_3$), sodium chloride (NaCl), potassium sulfate ($K_2SO_4$), potassium nitrate ($KNO_3$), potassium chloride (KCl), lithium sulfate ($Li_2SO_4$), lithium chloride (LiCl), lithium perchlorate ($LiClO_4$), calcium nitrate ($Ca(NO_3)_2$), and magnesium sulfate ($MgSO_4$).

As used herein, the term "current collector" means an electrically conductive connector between electrode material of a supercapacitor and an external circuit connected to the supercapacitor.

As used herein, the term "encase" means to partially or fully encapsulate.

As used herein, the term "flexible" means a material capable of bending without breaking.

As used herein, the term "fresh" means a fluid which has not been used in the current manufacturing cycle.

As used herein, the term "high surface area material" means a material having a surface area to mass ratio of at least 100 $m^2/g$.

As used herein, the term "organic electrolyte" means an electrically conducting solution of a substance dissolved in an organic solvent. The substance may include, but is not limited to, a salt, tetraethylammonium tetrafluoroborate ($TEABF_4$), tetraethylammonium difluoro(oxalato)borate (TEAODFB), lithium hexafluorophosphate ($LiPF_6$), $Bu_4NBF_4$, LiTFSI, or spiro-(1,10)-bipyrrolidinium tetrafluoroborate ($SBPBF_4$). The organic solvent may include, but is not limited to propylene carbonate (PC), butylene carbonate (BC), g-butyrolactone (GBL), g-valerolactone (GVL), acetonitrile (ACN), propionitrile (PN), glutaronitrile (GLN), adiponitrile (ADN), methoxyacetonitrile (MAN), 3-methoxypropionitrile (MPN), N,N-dimethylformamide (DMF), N,N-dimethylacetamide (DMA), N-methylpyrrolidinone (NMP), N-methyloxazolidinone (NMO), N,N'-dimethylimidazolidinone (DMI), nitromethane (NM), nitroethane (NE), sulfolane (TMS), 3-methylsulfolane (3MS), dimethylsulfoxide (DMSO), trimethyl phosphate (TMP), hexafluoro-2-propanol (HFIP), 1,3-propylene sulfite (PS), ethylene carbonate (EC), diethyl carbonate (DEC), dimethyl carbonate (DMC), ethyl acetate (EA), or combinations thereof.

As used herein, the term "polymer electrolyte" means a polymer material which includes an electrolyte material to provide conductivity.

As used herein, the term "supercapacitor" means an electrical energy storage device which stores energy in part or in whole in double-layers of electrical charges, where one layer is composed of a charged electrode material and the other a layer of ions from an adjacent electrolyte. Supercapacitors generally possess specific energy densities greater than 0.05 Wh/kg and are capable of delivering specific power densities in excess of 10 W/kg.

DETAILED DESCRIPTION OF THE INVENTION

FIG. 1 illustrates a cross-sectional view of an exemplary embodiment of polymer supercapacitor 100. Polymer supercapacitor 100 includes a coating 10 on a flexible electrode plate 20, and first and second flexible plates 30a and 30b. In the exemplary embodiment, polymer supercapacitor 100 is enclosed in an optional housing 40. Housing 40 is an electrically non-conductive material encasing polymer supercapacitor 100.

Coating 10 is a polymer electrolyte encasing flexible electrode plate 20. The polymer component of coating 10 is a conductive hydrogel or other conductive polymer material such as, but not limited to, poly(vinyl alcohol) (PVA), potassium polyacrylate (PAAK), poly(ethyl oxide) (PEO), poly(methylmethacrylate) (PMMA), poly(ether ether ketone) (PEEK), polyethylene oxide (PEO), poly(acrylic acid) (PAA), polyaniline (PANI), poly(vinylidene fluoride) (PVDF), poly(vinylidene fluoride-co-hexafluoropropylene) (PVDF-HFP), or poly(acrylonitrile)-block-poly(ethylene glycol)-block-poly(acrylonitrile) (PAN-b-PEG-b-PAN). The electrolyte component of coating 10 is an aqueous acid electrolyte, aqueous base electrolyte, aqueous neutral electrolyte or organic electrolyte added to the polymer.

Because the electrolyte is bound within a flexible polymer matrix, mechanical distortion of polymer supercapacitor 100 does not engender loss of the electrolyte, allowing increased mechanical flexibility of polymer supercapacitor 100. Furthermore, coating 10 simultaneously serves as both electrolyte and separator, eliminating a cost-, mass- and size-increasing electrolyte separator.

Flexible electrode plate 20 is a sheet of modified high surface area material (HSAM), folded into a C-shape and serving as supercapacitor 100 electrodes. In the exemplary embodiment, the HSAM is carbon nanotubes (CNTs). In other embodiments, the HSAM is graphene, carbon fiber, activated carbon, carbon aerogel, or mesoporous carbon. Such materials support the formation of a so-called "electrical double layer," which permits substantial charge storage in thin, lightweight matrices. In certain embodiments, flexible electrode plate 20 is made up of a plurality of connected HSAM panels. This allows the creation of larger supercapacitors 100 using available or standard sizes of HSAMs.

Each flexible electrode plate 20 is modified by the addition of metal oxide particles. When embedded in flexible electrode plate 20, these metal oxide particles provide "pseudocapacitance," which creates additional charge storage capacity. Because flexible electrode plate 20 is encased by coating 10, mechanical distortion of polymer supercapacitor 100 reduces potential loss of the metal oxide particles or of HSAMs, increasing the likelihood that polymer supercapacitor 100 retains charge storage capacity and does not shed potentially hazardous materials.

Submersion in an aqueous solution of a metal oxide precursor modifies each flexible electrode plate 20. In certain embodiments, the solutions include a transition metal that forms the metal oxide, such as, but not limited to, ruthenium, manganese, nickel, cobalt, zinc, or vanadium, which exhibit multiple valance states and reversible surface redox reactions. The aqueous solutions of metal oxide precursors include, but are not limited to, potassium perruthenate ($KRuO_4$), potassium permanganate ($KMnO_4$), manganese nitrate ($Mn(NO_3)_2$), nickel nitrate ($Ni(NO_3)_2$), cobalt nitrate ($Co(NO_3)_2$), zinc nitrate ($Zn(NO_3)_2$), vanadyl nitrate ($VO(NO_3)_3$), or vanadyl sulfate ($VOSO_4$).

First and second flexible plates 30a and 30b form upper and lower current collector surfaces, respectively, of polymer supercapacitor 100. After coating 10 encases flexible electrode plate 20, flexible electrode plate 20 folds in half to form a C-shape. First and second flexible plates 30a and 30b attach to the upper and lower surfaces of the resultant folded structure, respectively. First and second flexible plates 30a and 30b are made from a conductive material such as, but not limited to, copper stainless steel, aluminum, or conductive vinyl. First and second flexible plates 30a and 30b each have a thickness ranging from 0.004 mm to 15 mm.

At least two electrical connection components 31a and 31b extend from first and second flexible plates 30a and 30b to the outside of housing 40. In the exemplary embodiment, electrical connection components 31a and 31b are extensions of first and second flexible plates 30a and 30b. In other embodiments, electrical connection components 31a and 31b may be wire connectors extending through an aperture in housing 40 or conductive material embedded in housing 40.

Figure 2:
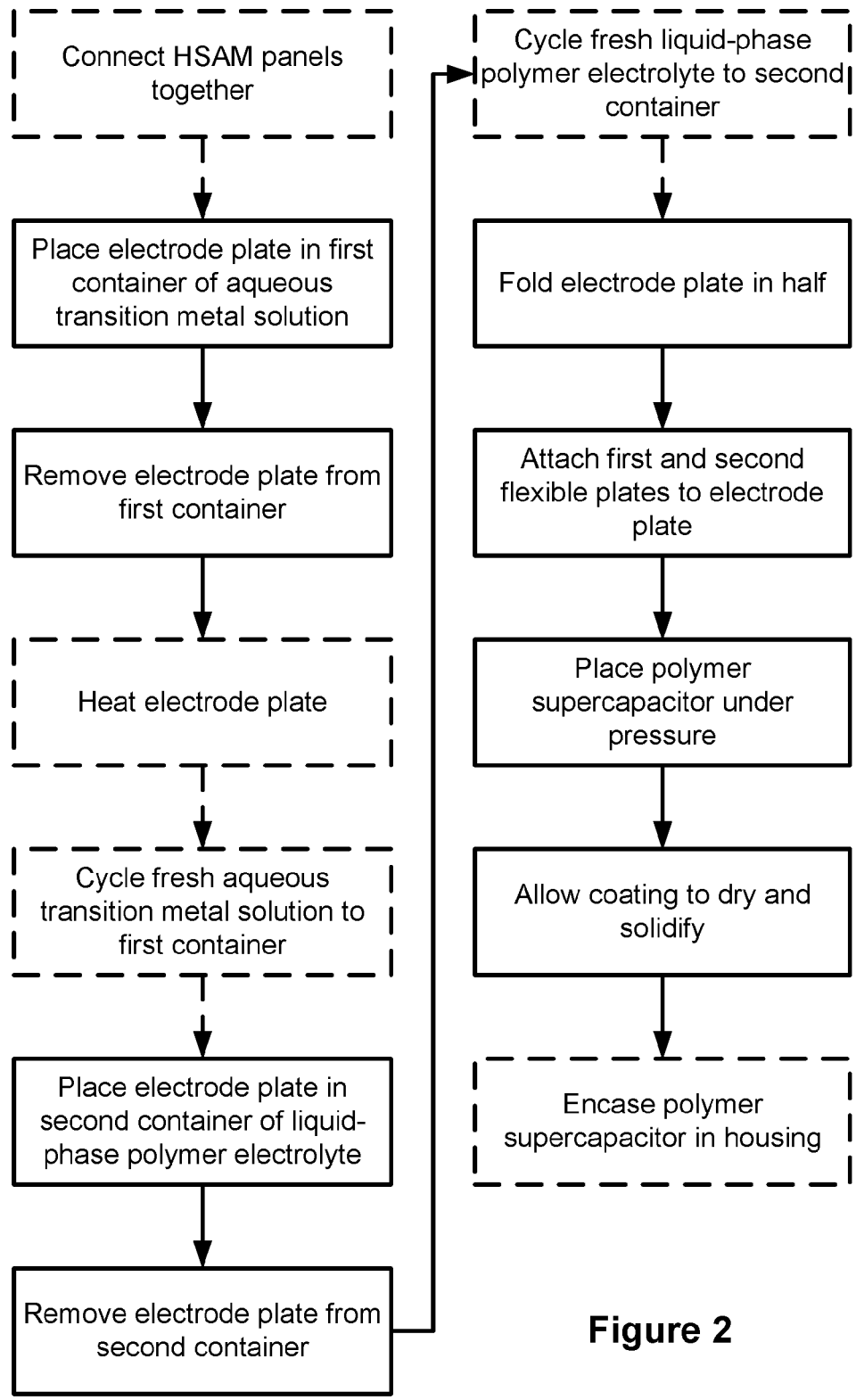
FIG. 2 illustrates a flowchart of an exemplary embodiment of a method for producing a polymer supercapacitor.

FIG. 2 illustrates a flowchart of an exemplary embodiment of a method 200 for producing polymer supercapacitor 100.

In optional step 202, method 200 connects a plurality of HSAM panels together to create at least one flexible electrode plate 20.

In step 204, method 200 places at least one flexible electrode plate 20 in a first container of aqueous transition metal solution to chemically modify flexible electrode plate 20 with transition metal oxide particles. In certain embodiments, method 200 processes multiple flexible electrode plates 20 at the same time, limited only by the size of the first container.

In step 206, method 200 removes flexible electrode plate 20 from the first container.

In optional step 208, method 200 heats flexible electrode plate 20 to a temperature ranging from approximately 40 degrees C. to approximately 500 degrees C. to promote drying or crystallization.

In optional step 210, method 200 cycles fresh aqueous transition metal solution to the first container.

In step 212, method 200 places flexible electrode plate 20 in a second container of liquid-phase polymer electrolyte to encase flexible electrode plate 20 in coating 10.

In step 214, method 200 removes flexible electrode plate 20 from the second container.

In optional step 216, method 200 cycles fresh liquid-phase polymer electrolyte to the second container.

In step 218, method 200 folds flexible electrode plate 20 in half to create a C-shape.

In step 220, method 200 attaches first and second flexible plates 30a and 30b to the upper and lower surfaces of the folded flexible electrode plate 20, respectively, to form polymer supercapacitor 100.

In step 222, method 200 places polymer supercapacitor 100 under pressure. This pressure may range from approximately 0.1 MPa to approximately 100 MPa.

In step 224, method 200 allows coating 10 to dry and solidify.

In optional step 226, method 200 encases polymer supercapacitor 100 in housing 40.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the term "approximately" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention.

What is claimed is:

1. A method of making a polymer supercapacitor device, comprising the steps of:
    placing at least one flexible electrode plate in a first container of aqueous metal solution;
    removing said at least one flexible electrode plate from said first container;
    placing said at least one flexible electrode plate in a second container of liquid-phase polymer electrolyte and encasing said at least one flexible electrode plate in a coating;
    removing said at least one flexible electrode plate from said second container;
    folding said at least one flexible electrode plate in half;
    attaching first and second flexible plates to an upper surface and a lower surface respectively, of said at least one flexible electrode plate to form said polymer supercapacitor.

2. The method of claim 1, further including the step of connecting a plurality of HSAM panels together to create at least one at least one flexible electrode plate.

3. The method of claim 1, further including the step of heating said at least one flexible electrode plate.

4. The method of claim 3, wherein said at least one flexible electrode plate is heated to a temperature ranging from approximately 40 degrees C. to approximately 500 degrees C.

5. The method of claim 1, wherein said aqueous metal solution is selected from the group consisting of: potassium perruthenate ($KRuO_4$), potassium permanganate ($kMnO_4$), manganese nitrate ($Mn(NO_3)_2$), nickel nitrate ($Ni(NO_3)_2$), cobalt nitrate ($Co(NO_3)_2$), zinc nitrate ($Zn(NO_3)_2$), vanadyl nitrate ($VO(NO_3)_3$), and vanadyl sulfate ($VOSO_4$).

6. The method of claim 1, further including the step of cycling fresh aqueous metal solution to said first container.

7. The method of claim 1, further including the step, of cycling fresh liquid-phase polymer electrolyte to said second container.

8. The method of claim 1, further including the step of encasing said polymer supercapacitor in a housing.

9. The method of, claim 1, wherein said at least one flexible electrode plate comprises a plurality of flexible electrode plates processed simultaneously.

10. The method of claim 1, further including the step of placing said polymer supercapacitor under pressure, wherein said pressure ranges from approximately 0.1 MPa to approximately 100 MPa.

11. The method of claim 10, further including the step of said coating to dry and solidify.

* * * * *